United States Patent [19]

Olafsson

[11] Patent Number: 5,870,438
[45] Date of Patent: Feb. 9, 1999

[54] FAST RESYNCHRONIZATION SYSTEM FOR HIGH-SPEED DATA TRANSMISSION

[75] Inventor: Sverrir Olafsson, Seltiamames, Iceland

[73] Assignee: Rockwell Int'l. Corp., Newport Beach, Calif.

[21] Appl. No.: 721,149

[22] Filed: Sep. 26, 1996

[51] Int. Cl.[6] ................................................ H04L 7/04
[52] U.S. Cl. .................... 375/344; 375/345; 375/355; 375/362
[58] Field of Search .................................. 375/222, 322, 375/324, 326, 328, 329, 340, 344, 345, 354, 355, 362–371; 329/304, 306, 310; 348/500, 536–538; 358/409–412; 370/503, 516, 520

[56] References Cited

U.S. PATENT DOCUMENTS 5,513,221 4/1996 Parr et al. ................................ 375/344
5,654,982 8/1997 Goodson et al. ........................ 375/222

*Primary Examiner*—Amanda Le
*Attorney, Agent, or Firm*—James P. O'Shaughnessy; Susie H. Oh

[57] ABSTRACT

A system for resynchronizing the timing and carrier phases of a modem receiver signal to enable the receiver to quickly reacquire the timing phase and the carrier phase, and thereby restart the demodulation process. The system provides accurate estimates of the timing and carrier phases, as well as a gain correction factor to provide for proper alignment for decoding. The discrete Fourier transform of the received signal is multiplied by the complex conjugate of the discrete Fourier transform of the transmitted signal to produce estimates of the desired phases. Gain control and carrier phase control are performed to determine corresponding error signals to adapt the resultant estimated timing and carrier phases, and gain correction.

28 Claims, 2 Drawing Sheets

FAST RESYNCHRONIZATION SYSTEM FOR HIGH-SPEED DATA TRANSMISSION

BACKGROUND OF THE INVENTION

1. Field of the Invention

The present invention relates to improving receiver resynchronization in half-duplex or polled modem systems and, more particularly, to a procedure for estimating carrier and timing phases of a signal transmitted by a remote modem to allow immediate continuation of data reception.

2. Description of Related Art

High-speed data transmission has become an accepted and expected feature of newer and more complex modems. Generally, transmission occurs as full-duplex (FDX) or half-duplex (HDX). In HDX transmission, information may travel from one end to the other, e.g., from a local modem to a remote, at any given time, thus causing a need to regularly change the direction of transmission. For example, in facsimile transmission, after a "page" is transmitted from one side to the other, the receiving end must indicate whether the page was received without error, or whether a retransmission is needed. This causes an interruption in transmission, and when the next page is to be transmitted, it is important to quickly resume transmission at a high speed. Similarly, FDX transmission generally begins in HDX mode, where training procedures will require a similar "turning around" of the direction of transmission.

Generally, modem transmission begins with a training phase when a receiver configures itself to best receive a modem signal over the channel. This training involves correcting for the level attenuation of the channel (gain control), training up an equalizer which is a filter resembling the inverse of the channel, synchronizing the receiver to the phase and frequency offset of the signal carrier induced by the channel, as well as synchronizing to the symbol timing phase and clock offset between the two modems. Once the receiver has adapted to the remote signal and the channel's effect on it, data transmission can proceed at a high data rate. However, if an interruption occurs, perhaps due to channel "turn-around" mentioned above, this synchronization will be lost. When transmission resumes, it will be necessary to reacquire the symbol timing and carrier phase to continue high-speed reception of data. The equalizer configuration, however, can generally be stored during the interruption, and the carrier frequency offset and symbol timing clock offset generally do not change. Channel attenuation generally does not change either, and can either be stored or re-estimated.

More particularly, during the initial training sequence which is relatively long, when the timing and carrier recovery loops as well as the equalizer are trained up, the frequency offsets of the timing carrier loops are determined via the modem controller. Normally, this is a four-point or sixteen-point uncoded signal constellation, generated from a pseudo-random bit generator. For resynchronization, the timing recovery requires that the "center" of the symbol be determined, while the carrier recovery finds the "reference" phase of the carrier. For example, if the transmitter carrier is cos (ωt+a), the receiver demodulates using cos (μt+b). The carrier recovery adapts μ toward ω and b toward a, such that μ and b begin at 0 or some other predetermined value, and are then corrected such that they gradually approach their targets. That is, μ approaches ω, and b approaches a.

In general, the most crucial parameter to reacquire is the timing, or sampling, phase. The timing phase is the symbol reference. The timing recovery is performed by calculating a timing error signal that gives an indication of the error of the symbol phase estimate. For example, its sign may be positive if the timing of the symbol phase is too early and negative if it is too late. The magnitude of the error signal will generally reflect how far off the timing is from the correct symbol phase estimate. This error signal is then passed through a low-pass filter and used to shift the timing phase, either by varying a sampling clock or by controlling an interpolator. Since, by definition, error correction reduces the error, the timing tends to converge toward the optimum phase. At high data rates, for example, where the number of bits per symbol can be as high as 10, the timing phase must be accurately estimated to within 1 to 2%. However, a regular phase-locked loop usually requires a significant amount of time to converge and settle to a good estimate of the symbol phase.

The carrier phase is generally related to the timing phase. If, for example, the transmit clock is running faster than the receiver's clock, the carrier will have a higher frequency in the transmitter relative to the receiver. Further, the channel phase response will change the carrier phase, and may even change the frequency of the carrier (e.g., in Frequency Division Multiplex systems). The carrier recovery corrects for these effects. However, because of the relation to the symbol timing, it must do so either jointly with the symbol timing recovery or after it. A change or correction in symbol timing will produce a change in carrier phase, which may either be corrected via the knowledge of the timing correction, or simply by measuring the carrier phase caused by the timing change and correcting for it.

SUMMARY OF THE INVENTION

It is an object of the present invention to provide a fast resynchronization procedure which enables high-speed data transmission to be quickly resume in the event of interruptions. This and other objects and advantages are achieved in a resynchronization system which provides accurate estimates of timing phase and carrier phase, as well as a gain correction factor. Although the resynchronization procedure can be used with different types of data signals it is notably efficient if used with a repeated constant amplitude zero-auto correlation (CAZAC) sequence at the beginning of transmission. The preferred resynchronization estimates one or more of the initial timing phase, carrier phase, or signal level by receiving a signal corresponding to a known transmitted signal ("received signal"), modifying the received signal with predetermined start value(s) to produce a modified signal, multiplying a discrete Fourier transform (DFT) of the modified signal with the complex conjugate of the DTF of the known transmitted signal to obtain a product, and using the product to develop the estimate(s). The predetermined start value(s) are preferably previously-determined estimates (which may or may not be completely wrong), but may be arbitrary values such as zero.

DETAILED DESCRIPTION OF THE PREFERRED EMBODIMENTS

The following description is of the best presently contemplated mode of carrying out the invention. In the accompanying drawings, like numerals designate like parts in the several figures. This description is made for the purpose of illustrating the general principles of the invention and should not be taken in a limiting sense. The scope of the invention is best determined by reference to the accompanying claims.

Figure 1:
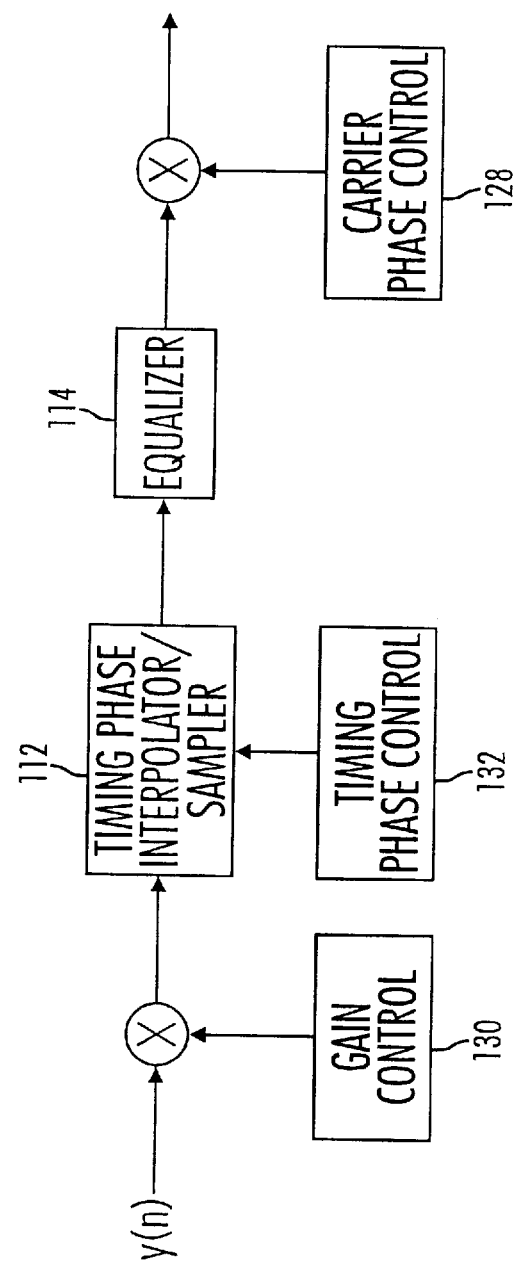
FIG. 1 is a block diagram of a steady state modem receiver in accordance with an embodiment of the present invention.

A modem receiver according to an embodiment of the present invention is shown generally in FIG. 1. A received signal y(n) is modified, as described more fully below, by one or more of a means for scaling the received signal y(n) 130, a means for shifting the symbol timing of the received signal 132, and a means for shifting the carrier phase of the received signal y(n) 128. The received signal y(n) is first scaled by a gain control signal 130, before being input into the timing phase interpolator/sampler 112. The gain control 130 can be performed using a variety of standard techniques. Essentially, the gain control incorporates an error signal which is generated by comparing the input signal level, after correction, to a reference value. The error signal is used to correct a gain estimate, which is generally logarithmic. The gain estimate is then used to produce a linear scale value to scale the input signal to give a constant input level.

Preferably, embodiments of the present invention are implemented using a repeated CAZAC sequence at the beginning of transmission for fast estimation of the channel response. More particularly, a CAZAC sequence is desired because in the complex baseband, the signal points in the sequence have the same energy, such that correlation with its conjugate generally results in zero except when the two sequences are aligned. That is, if a repeated CAZAC sequence is sent over a channel, and the received signal y(n) is filtered with the CAZAC sequence, i.e., by using the complex conjugate of the CAZAC signal points as filter coefficients, the output will simply be the channel impulse response.

In accordance with preferred embodiments of the present invention, the timing phase interpolator/sampler 112 provides a controlled signal timing phase, as part of the receiver's timing recovery. This can be done in several different ways. In one method, the time instant an analog signal is sampled by an A/D converter is controlled 132. A timing error controls a clock circuit to determine this sampling instant. Consequently, to shift the timing phase of the received signal, the sample time is then shifted to determine the controlled signal phase.

When using newer sigma-delta A/D converters, interpolators are generally used to determine the signal timing phase. The interpolators typically comprise selectable filters which have the same frequency-amplitude response, and group-delay which is constant in frequency throughout the signal bandwidth. This constant delay, however, is different for each filter in the set. A timing error is used to update a timing phase estimate. Accordingly, to produce a given timing phase, the filter having delay characteristics closest to the desired delay is selected.

Figure 2:
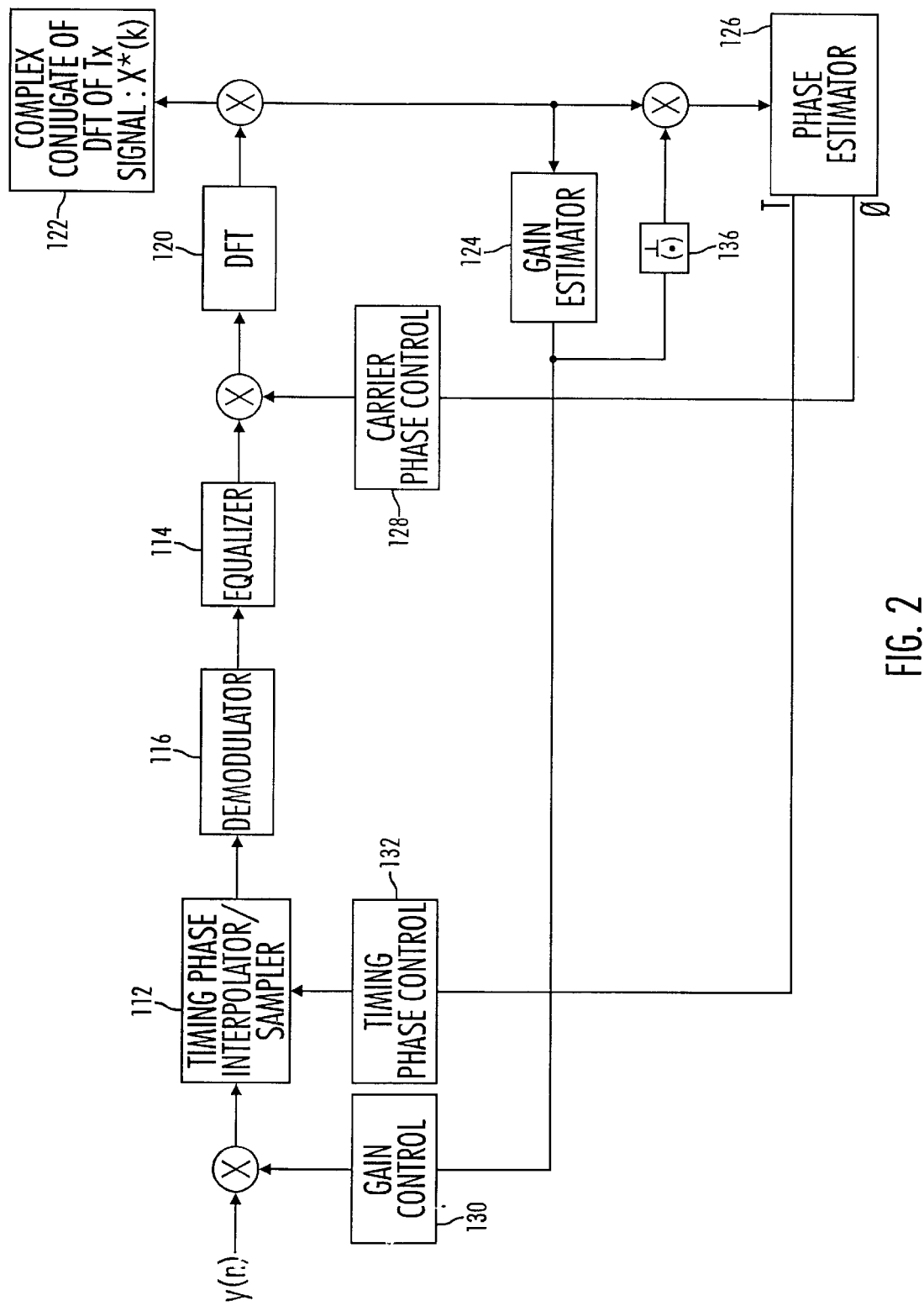
FIG. 2 is a block diagram of a fast resynchronization system in accordance with an embodiment of the present invention.

As illustrated in the embodiment of FIG. 2, the output of the timing phase interpolator/sampler 112 is input into demodulator 116, where the signal is translated in frequency by multiplying the signal with a complex exponential having a phase representing the inverse of the nominal carrier phase, followed by a low-pass filter. The output of the demodulator is then input into the equalizer 114, which is preferably an adaptive filter that is approximately the inverse of the channel. The output of the equalizer 114 is multiplied by a complex exponent with a phase that is the negative of the carrier phase estimate 128. That is, if $\phi$ represents the phase estimate, the equalizer output 114 is multiplied by $e^{-j\phi}$. In preferred embodiments, the carrier phase control 128, like the equalizer 114, is adaptive wherein it uses a carrier phase error signal to update its carrier phase estimate. The carrier phase estimate 128 is then applied to rotate the signal output from the equalizer 114 to remove the carrier phase offset.

The gain control, timing recovery, equalizer and carrier recovery all operate on the general principle of applying a correction based on an estimate, measuring the resulting error, then using that error to improve the estimate. It will thus be recognized that, since these functions are linear, the operations of the gain control 130, interpolator/sampler 112, demodulator 116, equalizer 114, and carrier phase control 128 may be interchangeably performed and/or partially combined. If the reception is interrupted, however, the timing and carrier phase estimates will usually be incorrect. Using the steady state methods of adapting the estimates will at best require a significant amount of time before enabling high-speed data transmission. In many cases, the estimates may not converge at all since the error signals are only valid if the errors are small. Thus, embodiments of the present invention describe a method of obtaining initial estimates of the carrier and timing phases which ensures that the phase errors are small. Accordingly, high-speed transmission can resume quickly.

More particularly, beginning with a transmit signal x(n), its DFT is represented as:

$$X(k) = \sum_{n=0}^{N-1} x(n)e^{-j2\pi nk/N}.$$

Suppose the signal is time shifted relative to x, such that:

$$x'(n) = x(n-\tau)$$

then by rearranging the summation term of the DFT:

$$\begin{aligned} x'(n)e^{-j2\pi nk/N} &= x(n-\tau)e^{-j2\pi nk/N} \\ &= x(n-\tau)e^{-j2\pi(n-\tau)k/N}e^{-j2\pi\tau k/N} \end{aligned}$$

we find that:

$$X'(k) = e^{-j2\pi\tau k/N}X(k).$$

If the signal's carrier phase is also shifted, it becomes $$x''(n) = e^{j\phi}x'(n).$$

As a result, the DFT of the signal, after being time and phase shifted, is $$X''(k) = e^{j(\phi - 2\pi\tau k/N)}X(k).$$

Incorporating a scale factor thus provides a modified signal x'''(n):

$$x'''(n) = \alpha x''(n).$$

The DFT of a scaled, and time and phase shifted version of x(n) is then:

$$X'''(k) = \alpha e^{j(\phi - 2\pi\tau k/N)}X(k).$$

FIG. 2 shows a block diagram of a preferred embodiment of the present invention. The initially received signal, which is indicated to be y(n) in FIG. 2, is first scaled 130 based on a predetermined gain value such as a previous gain estimate and its timing phase is shifted 112 by a predetermined timing phase value such as a previous estimate 132. At this time, the earlier estimate may be completely incorrect or inaccurate. The previously-determined estimates may also be values which have been initialized to zero. The signal is then passed through the equalizer 114 and its carrier phase is corrected 128 based on a predetermined carrier phase value such as a previous estimate. This correction, like the timing phase correction estimate, may also be quite inaccurate at this point. Ultimately, the modified signal x'''(n) is determined, where the gain, timing phase and carrier phase offsets of the combined effect of the channel, the gain control 130, the timing phase interpolator/sampler 112 and the carrier phase control 128, respectively, are given by $\alpha$, $\tau$ and $\phi$. That is, $$x'''(n) = \alpha e^{j\phi} x(n-\tau).$$

Thus, the DTF x'''(k() 120 of the received signal x'''(n) can be determined and multiplied by the complex conjugate 122 of the DFT x(k) of the transmitted signal to yield:

$$X'''(k) \cdot X^*(k) = \alpha e^{j(\phi - 2\pi\tau k/N)} X(k) X^*(k).$$

And the scaling factor $\alpha$ can be estimated as:

$$\alpha = \left( \frac{1}{N} \left[ \sum_{k=0}^{N-1} \frac{D(k)D^*(k)}{(X(k)X^*(k))^2} \right] \right)^{\frac{1}{2}}$$

where $D(k) = X'''(k)X^*(k)$. Clearly, it may be advantageous to design X(k) such that $X(k)X^*(k)=1$ at all k, in which case the scaling factor estimate becomes $$\alpha = \left( \frac{1}{N} \left[ \sum_{k=0}^{N-1} D(k)D^*(k) \right] \right)^{\frac{1}{2}}.$$

An estimate of the phase function can then be computed, where the phase function is given by:

$$\psi(k) = \text{Arg}(X'''(k)X^*(k)) = \phi - 2\pi\tau k/N.$$

According to the resultant linear function, its value at k=0 represents the carrier phase shift, and the slope represents the timing phase shift. Utilizing the estimate of $\alpha$, the values of $\psi(k)$ can be calculated by multiplying D(k) by $1/\alpha$ 136, or by independently considering values of the imaginary part of D(k) divided by the real part; that is, $\text{Im}[D(k)]/\text{Re}[D(k)]$.

Using the well-known minimum mean-square error (MMSE) solution for the parameters, given K samples $\{x_n\}$ and $\{y_n\}$ of a linear function y=ax+b, the MMSE estimates of a and b are given by $$a = \frac{K\Sigma x_k y_k - \Sigma x_k \Sigma y_k}{K\Sigma x_k^2 - (\Sigma x_k)^2}$$

$$b = \frac{\Sigma x_k^2 \Sigma y_k - \Sigma x_k \Sigma x_k y_k}{K\Sigma x_k^2 - (\Sigma x_k)^2}$$

Thus, given examples of the phase function $\psi(k)$, the values of $\tau$ and $\phi$ can be estimated by the phase estimator 106. The above $x_k$ represent the sample frequencies, which are assumed to be evenly spaced at $2\pi k/N$. It will be recognized, however, that the characteristics of these frequencies can be easily generalized to where they are not uniformly spaced. After simplifying, $\tau$ and $\phi$ are determined to be $$\tau = -\left(\frac{N}{2\pi}\right)^2 \frac{K\Sigma k\phi(k) - \Sigma k\Sigma \phi(k)}{K\Sigma k^2 - (\Sigma k)^2}$$

$$\phi = \frac{\Sigma k^2 \Sigma \phi(k) - \Sigma k\Sigma k\phi(k)}{K\Sigma k^2 - (\Sigma k)^2}$$

Since many of the parameters can be precomputed, the following variables may be defined as:

$$A = (K\Sigma k^2 - (\Sigma k)^2)^{-1}$$

$$B = \Sigma k$$

$$C = \Sigma^2$$

$$D = \Sigma \psi(k)$$

$$E = \Sigma k\psi(k)$$

and solution can be expressed more simply as:

$$\tau = -\left(\frac{N}{2\pi}\right)^2 A(KE - BD)$$

$$\phi = A(CD - BE)$$

It can be seen that only D and E depend on the sample data, while A, B, and C can be precomputed. The values thus obtained are then added to the corresponding estimates in the timing phase control 132 and the carrier phase control 128.

By accurately and quickly estimating the carrier phase offset $\phi$ and the timing phase offset $\tau$ relative to the receiver, the timing and carrier phases can be quickly resynchronized, and thus aligned properly for decoding.

It will be recognized that embodiments of the present invention may also be applied to phase jitter tracker resynchronization. Phase jitter tracker loops track periodic, typically sinusoidal, variations in the carrier phase. By applying the above-described scheme to consecutive blocks of received signals, and comparing the variation in carrier phase estimate from one block to another, an estimate of the phase jitter phase may be obtained if the phase jitter frequency has been determined previously.

What is claimed is:

1. A system for estimating a timing phase and a carrier phase offset of a received signal corresponding to a known transmitted signal for resuming high-speed data reception of transmitted data signals that were previously interrupted, the system comprising:

means for modifying the received signal to produce a modified signal;

means for determining a discrete Fourier transform (DTF) of the modified signal;

means for determining a DFT of the known transmitted signal;

means for determining a complex conjugate of the DFT of the known transmitted signal;

a multiplier for calculating a product of the DFT of the modified signal and the complex conjugate of the DFT of the known transmitted signal;

a phase estimator for obtaining a phase function based upon the product of the multiplier, the phase function being a linear function of the carrier phase offset and timing phase offset; and means for estimating the timing phase offset and carrier phase offset according to the phase function.

2. The system of claim 1 wherein the modifying means comprises a means for scaling the received signal based on a predetermined gain value.

3. The system of claim 2 wherein the predetermined gain value is a previous gain estimate.

4. The system of claim 1 wherein the modifying means comprises a means for shifting a timing phase of the received signal based on a predetermined timing phase value.

5. The system of claim 4 wherein the predetermined timing phase value is a previously-determined estimate of the timing phase offset.

6. The system of claim 1 wherein the modifying means comprises a means for shifting a carrier phase of the received signal based on a predetermined carrier phase value.

7. The system of claim 6 wherein the predetermined carrier phase value is a previously-determined estimate of the carrier phase offset.

8. The system of claim 1 wherein the complex conjugate is precomputed and wherein the means for determining a DFT of the known transmitted signal and means for determining a complex conjugate of the DFT of the known transmitted signal collectively comprise a means for storing the complex conjugate.

9. A system for resynchronizing timing and carrier phase by estimating a timing phase offset and a carrier phase offset of a received signal y(n) corresponding to a known transmitted signal x(n) for resuming high-speed data reception of transmitted signals that were previously interrupted, the system comprising:

means for modifying the received signal y(n) to produce a modified signal x'''(n);

means for determining a discrete Fourier transform (DFT) X'''(k) of the modified signal x'''(n) at more than one value of k, the DFT having plural input samples;

means for determining a DFT X(k) of the known transmitted signal at more than one value of k;

means for determining a complex conjugate X*(K) of the DFT of the known transmitted signal;

a multiplier for multiplying X'''(k) by X*(k);

a phase estimator for obtaining an estimate of a phase function:

$$\psi(k) = \phi - 2\pi \tau K/N$$

the phase function being a linear function of k with a value $\phi$ at k=0 representing carrier phase offset and a slope $2\pi\tau/N$ representing timing phase offset; and means for estimating the timing phase offset $\tau$ and carrier phase offset $\phi$ according to the phase function.

10. The system of claim 9, further comprising a gain estimator for providing a scale factor $\alpha$ which is proportional to the product of X'''(k) and X*(k).

11. The system of claim 10, wherein the scale factor $\alpha$ is determined according to:

$$\alpha = \left( \frac{1}{N} \left[ \sum_{k=0}^{N-1} \frac{D(k)D^*(k)}{(X(k)X^*(k))^2} \right] \right)^{\frac{1}{2}}$$

where D(k)=X'''(k)X*(k).

12. The system of claim 10, wherein the scale factor $\alpha$ is determined according to:

$$\alpha = \left( \frac{1}{N} \left[ \sum_{k=0}^{N-1} D(k)D^*(k) \right] \right)^{\frac{1}{2}}$$

where D(k)=X'''(k)X*(k), and X(k)X*(k)=1 at all k.

13. The system of claim 9, wherein the phase function is determined according to:

$$\psi(k) = \text{Arg}(X'''(k)X^*(k)),$$

where $X'''(k) \cdot X^*(k() = \alpha e^{j(\phi - 2\pi\tau k/N)} X(k)X^*(k)$.

14. The system of claim 13, wherein the timing phase offset $\tau$ and carrier phase offset $\phi$ are estimated according to the equations:

$$\tau = -\left( \frac{N}{2\pi} \right)^2 \frac{K\Sigma k\phi(k) - \Sigma k \Sigma \phi(k)}{K\Sigma k^2 - (\Sigma k)^2}$$

$$\phi = \frac{\Sigma k^2 \Sigma \phi(k) - \Sigma k \Sigma k\phi(k)}{K\Sigma k^2 - (\Sigma k)^2}.$$

15. The system of claim 9, wherein the known transmitted signal x(n) is periodic.

16. The system of claim 9, wherein the known transmitted signal x(n) is a constant amplitude zero-auto correlation (CAZAC).

17. The system of claim 16, wherein the CAZAC sequence is periodic.

18. The system of claim 9, further comprising a gain controller for determining an error signal and adjusting a gain estimate based on the error signal, wherein the gain controller provides a scale factor to be multiplied by the received signal y(n).

19. The system of claim 18, further comprising a timing phase interpolator/sampler for processing the received signal y(n) multiplied by the gain controller scale factor to determine a controlled signal phase.

20. The system of claim 19, further comprising a demodulator coupled to the timing phase interpolator/sampler for translating the received signal y(n) in frequency.

21. The system of claim 19, further comprising:

an equalizer for receiving the controlled signal phase of the timing phase interpolator/sampler; and a carrier phase controller for adapting the estimated carrier phase according to an error signal, wherein the output of the carrier phase controller is applied to the output of the equalizer to update the estimated carrier phase.

22. The system of claim 21, wherein the equalizer comprises an adaptive filter.

23. The system of claim 19, wherein the timing phase interpolator comprises a selectable filter having predetermined phase characteristics.

24. A method for resynchronizing timing and carrier phases by estimating a timing phase offset and a carrier phase offset of a received signal y(n) corresponding to a known transmitted signal x(n) for resuming high-speed data reception of transmitted signals that were previously interrupted, the method comprising the steps of:

modifying the received signal y(n) to produce a modified signal x'''(n);

determining a discrete Fourier transform (DFT) X'''(k) of the modified signal x'''(n) at more than one value of k;

determining a DFT X(k) of the known transmitted signal;

calculating a complex conjugate X*(k) of the DFT of the known transmitted signal;

multiplying X'''(k) by X*(k);

obtaining an estimate of the phase function:

$$\psi(k) = \phi - 2\pi\tau k/N$$

the phase function being a linear function of k with a value $\phi$ at k=0 representing carrier phase offset and a slope $2\pi\tau/N$ representing timing phase offset; and estimating the timing phase offset $\tau$ and carrier phase offset $\phi$ according to the phase function.

25. The method of claim 24, further comprising the step of calculating a scale factor $\alpha$ which is proportional to the product of X'''(k) and X*(k).

26. The method of claim 24, further comprising the step of determining the phase function according to:

$$\psi(k) = \text{Arg}(X'''(k)X^*(k)),$$

where $X'''(k) \cdot X^*(k) = \alpha e^{j(\phi - 2\pi\tau k/N)} X(k) X^*(k)$.

27. The method of claim 26, wherein the timing phase $\tau$ and carrier phase $\phi$ are estimated according to the equations:

$$\tau = -\left(\frac{N}{2\pi}\right)^2 \frac{K\Sigma k\phi(k) - \Sigma k \Sigma \phi(k)}{K\Sigma k^2 - (\Sigma k)^2}$$

$$\phi = \frac{\Sigma k^2 \Sigma \phi(k) - \Sigma k \Sigma k \phi(k)}{K\Sigma k^2 - (\Sigma k)^2}.$$

28. The method of claim 24, wherein the known transmitted signal x(n) is a constant amplitude zero-auto correlation (CAZAC) sequence.

* * * * *